(12) United States Patent
Matsuzaki et al.

(10) Patent No.: US 11,273,509 B2
(45) Date of Patent: Mar. 15, 2022

(54) HEATING TOOL

(71) Applicant: Hakko Corporation, Osaka (JP)

(72) Inventors: Kenji Matsuzaki, Osaka (JP); Kenta Nakamura, Osaka (JP)

(73) Assignee: Hakko Corp., Osaka (JP)

( * ) Notice: Subject to any disclaimer, the term of this patent is extended or adjusted under 35 U.S.C. 154(b) by 216 days.

(21) Appl. No.: 16/451,403

(22) Filed: Jun. 25, 2019

(65) Prior Publication Data

US 2020/0030902 A1 Jan. 30, 2020

(51) Int. Cl.
*B23K 3/00* (2006.01)
*B23K 3/02* (2006.01)
*B23K 3/03* (2006.01)

(52) U.S. Cl.
CPC .............. *B23K 3/025* (2013.01); *B23K 3/033* (2013.01); *B23K 3/0346* (2013.01); *B23K 3/0369* (2013.01)

(58) Field of Classification Search
CPC .... B23K 3/025; B23K 3/0369; B23K 3/0346; B23K 3/033; B23K 3/0338; B23K 3/00–087
USPC ..................................................... 228/51–55
See application file for complete search history.

(56) References Cited

U.S. PATENT DOCUMENTS

| | | | | |
|---|---|---|---|---|
| 2,167,389 A * | 7/1939 | Kuhn | ................ | B23K 3/0353 219/239 |
| 2,552,193 A * | 5/1951 | Lennox | ................ | B23K 3/0361 219/239 |
| 2,562,791 A * | 7/1951 | Werner | ................ | B23K 3/0338 219/541 |
| 2,592,426 A * | 4/1952 | Jeffrey | ................ | B23K 3/0338 219/238 |
| 2,700,721 A * | 1/1955 | Kuehl | ................ | B23K 3/0353 219/238 |
| 2,717,952 A * | 9/1955 | Dvorak | ................ | B23K 3/033 219/237 |
| 2,735,923 A * | 2/1956 | Juvinall et al. | ........ | B23K 3/033 219/237 |
| 2,747,074 A * | 5/1956 | Finch | ................ | B23K 3/0361 219/237 |
| 3,136,878 A * | 6/1964 | Staller | ................ | B23K 3/0353 219/239 |
| 3,699,306 A * | 10/1972 | Finch | ................ | B23K 3/0338 219/241 |
| 3,716,692 A * | 2/1973 | Schick | ................ | G05D 23/24 219/241 |
| 3,770,937 A * | 11/1973 | Smits | ................ | B23K 3/033 219/241 |
| 3,786,229 A * | 1/1974 | Hombrecher | ........ | B23K 3/0338 219/241 |
| 4,785,793 A * | 11/1988 | Oglesby | ................ | B23K 3/022 126/413 |
| 4,839,501 A * | 6/1989 | Cowell | ................ | B23K 3/0361 219/229 |

(Continued)

FOREIGN PATENT DOCUMENTS

| | | | | |
|---|---|---|---|---|
| CN | 204668477 U | | 9/2015 | |
| EP | 1086772 A2 * | | 3/2001 | ........... B23K 3/0315 |

(Continued)

*Primary Examiner* — Kiley S Stoner
(74) *Attorney, Agent, or Firm* — David B Abel

(57) ABSTRACT

A heating tool having a temperature sensor fixed within a tip of the heating tool with maximum heat conductivity to the temperature sensor.

8 Claims, 2 Drawing Sheets

(56) References Cited

U.S. PATENT DOCUMENTS

| | | | | |
|---|---|---|---|---|
| 4,873,608 A * | 10/1989 | Yoshimura | B23K 3/0338 | 361/220 |
| 5,297,716 A * | 3/1994 | Smith | B23K 3/033 | 136/221 |
| 5,329,085 A * | 7/1994 | Cowell | B23K 3/0475 | 219/229 |
| 5,408,072 A * | 4/1995 | Nagase | B23K 3/033 | 219/616 |
| 6,054,678 A * | 4/2000 | Miyazaki | B23K 3/033 | 219/229 |
| 6,087,631 A * | 7/2000 | Miyazaki | B23K 3/033 | 219/229 |
| 6,215,104 B1 * | 4/2001 | Kurpiela | B23K 3/0369 | 219/238 |
| 2004/0195228 A1* | 10/2004 | Konishi | B23K 1/012 | 219/229 |
| 2005/0092729 A1* | 5/2005 | Konishi | B23K 3/03 | 219/229 |
| 2006/0022018 A1* | 2/2006 | Yoshimura | B23K 3/0361 | 228/54 |
| 2006/0108345 A1* | 5/2006 | Shigekawa | B23K 3/0338 | 219/229 |
| 2006/0157467 A1* | 7/2006 | Shigekawa | B23K 3/0361 | 219/229 |
| 2010/0187205 A1* | 7/2010 | Masaki | B23K 3/033 | 219/85.16 |
| 2015/0083707 A1* | 3/2015 | Miyazaki | B23K 3/03 | 219/238 |
| 2017/0028497 A1* | 2/2017 | Matsuzaki | G01K 7/02 | |
| 2017/0182577 A1* | 6/2017 | Kataoka | B23K 3/053 | |
| 2017/0368627 A1* | 12/2017 | Shigekawa | B23K 3/0338 | |
| 2018/0272452 A1* | 9/2018 | Clark | H05B 3/262 | |
| 2019/0299311 A1* | 10/2019 | Mochizuki | B23K 3/053 | |

FOREIGN PATENT DOCUMENTS

| | | | | |
|---|---|---|---|---|
| FR | 2397258 A1 * | 2/1979 | | B23K 3/025 |
| GB | 1309254 A * | 3/1973 | | B23K 3/033 |
| GB | 2110143 A * | 6/1983 | | B23K 3/03 |
| JP | 62288578 | 5/1989 | | |
| JP | 05285646 A * | 11/1993 | | |
| JP | 05318101 A * | 12/1993 | | |
| WO | WO-2015182487 A1 * | 12/2015 | | B23K 3/02 |

* cited by examiner

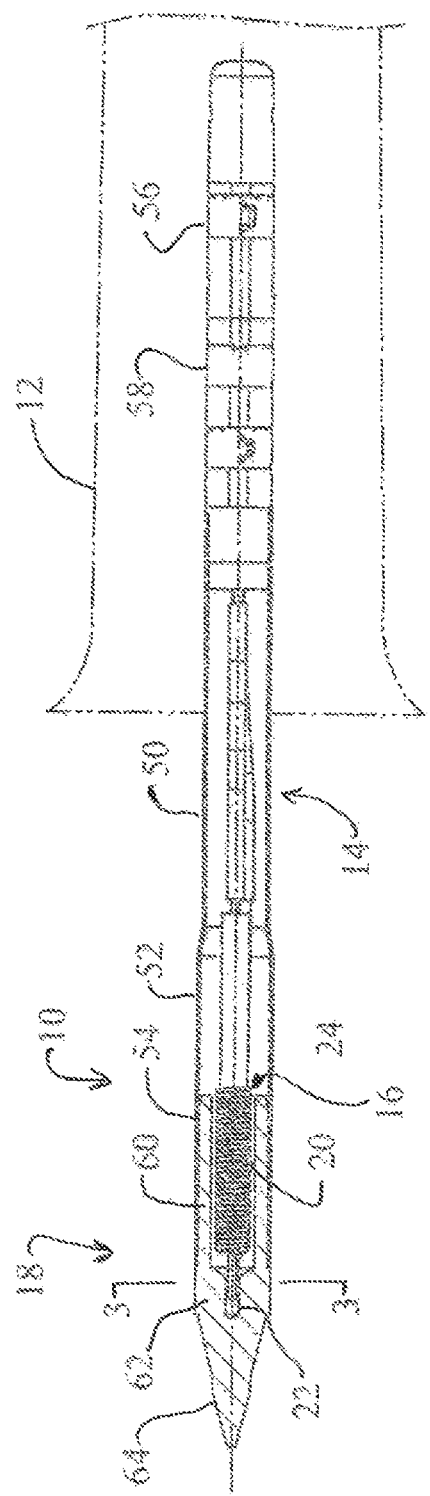
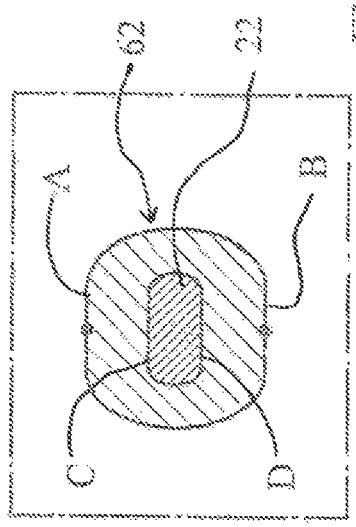

/ HEATING TOOL

BACKGROUND OF THE PRESENT INVENTION AND RELATED ART

The present invention relates to the field of heating tools such as soldering and de-soldering devices, hot air devices and thermal tools requiring precise temperature sensors for feedback control. These types of heating tool may require very accurate control of the temperature of the heating tool. For accurate temperature control, it is necessary to detect the operating temperature of the heating tool as precisely as possible.

Publication WO2010-084946 teaches how to fix a thermocouple temperature sensor within a soldering iron tip, which contributes to detecting the operating temperature of the soldering tip with high accuracy. In WO2010-084946, a pipe enclosing thermocouple is pushed into a recess inside of the soldering iron tip, and then the tip is pressed so that the pipe is fixed at an appropriate position within the tip. However, if the tip is pressed, the tip is deformed, and the press deformation of the tip causes a reduction in the heat transfer properties. Press deformation prevents heat from conducting from a heating element located within the soldering iron tip to the tip of the soldering tool. The time lag in the time to transfer heat and make a temperature change sensed by the thermocouple is delayed, potentially overheating the tip.

The present invention is related a heating tool having a temperature sensor fixed within a tip of the heating tool with maximum heat conductivity to the temperature sensor.

BRIEF DESCRIPTION OF THE DRAWINGS

FIG. 1 is an axial cross-sectional view of a soldering cartridge heating tool;

FIG. 3 is a cross-sectional view of the soldering cartridge heating tool at 3-3 of FIG. 1.

DETAILED DESCRIPTION OF THE INVENTION

Figure 2:
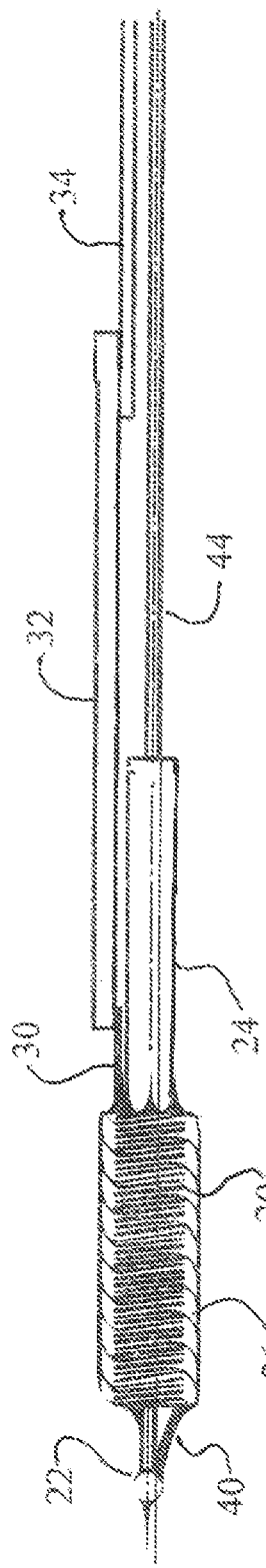
FIG. 2 is a side view of the heater assembly of the cartridge of FIG. 1.

FIG. 1 is an axial cross-sectional view of a soldering cartridge 10 type of heating tool. The cartridge 10 is mounted within and powered by a handle 12. The handle 12 is to be connected to a power station via a cord (not shown). A proximal end of the cartridge 10 is inserted axially into the handle 12. The cartridge 10 includes a hollow outer sleeve 14, a heater assembly 16 and a tip 18. The heater assembly has both a heater coil 20 and a temperature sensor 22.

FIG. 2 is a side view of the heater assembly 16 and associated wiring. The heater assembly 16 includes an insulation cylinder 24. The heater coil 20 is wrapped around the insulation cylinder 24. The heater coil 20 is then wrapped with an insulation layer 26. The heater coil 20 has a proximal end wire 30 connected to a proximally extending connecting wire 32. The connecting wire 32 may be connected to a second connecting wire 34 extending to the proximal end of the cartridge 10. The heater coil 20 also includes a distal end wire 40 extending to a thermocouple temperature sensor 22. A return wire 44 extends from the proximal end of the cartridge 10, axially through the center of the insulation cylinder 24 and terminating distally at the thermocouple temperature sensor 22, where the return wire 44 is joined to the distal end wire 40 of the heater coil 20.

The heater coil 20 is located between the insulation cylinder 24 and the insulation layer 26. The heater coil 20 is preferably a wound metal wire coil. Preferably, the heating coil wire is an iron-chromium (Fe—Cr) alloy. The diameter of heating coil wire of the heating coil is preferably between 0.2 mm and 0.45 mm.

The proximal end wire 30 is connected through the connecting wire 32 and 34 to a control circuit (not shown) within the handle 12. The return wire 44 is preferably a nickel (Ni) or nickel alloy. The return wire 44 is preferably thicker in cross-section as compared to the wire of the heater coil 20. The diameter of the return wire 44 is 0.5 mm to 0.7 mm, and preferably 0.6 mm. The distal end of the return wire 44 is connected to the distal end wire 40, which forms a bi-metallic thermocouple with the iron-chromium distal end wire 40 argon welded to the nickel/nickel alloy return wire 44.

The connecting wire 32 which is connected to the proximal end wire 30 of the heater coil 20 is a wire formed from the same material as that of the heating coil 20, however the connecting wire 32 has a larger diameter. Preferably, the diameter of the connecting wire 32 is between 0.8 mm and 1.2 mm. If the assembly includes a second connecting wire 34, the resistivity of the second connecting wire 34 is preferably smaller than that of the connecting wire 32. The diameter of the second connecting wire 34 is preferably less than 0.8 mm. The second connecting wire 34 is made from nickel (Ni) or nickel alloy. The hollow outer sleeve 14 and the tip 18 protect the heater assembly 16.

The hollow outer sleeve 14 includes a proximal end 50, a middle tube 52 and a distal heat transfer cylinder 54. The return wire 44, connecting wire 32 and the second connecting wire 34 are encased within the proximal end 50 of the hollow outer sleeve 14. The return wire 44 and the second connecting wire 34 are connected to the control circuit in the handle 12 via electrical contacts 56, 58 as illustrated in FIG. 1.

The tip 18 may include a cylindrical proximal end 60, a middle section 62 and a distal end 64. The cylindrical proximal end 60 surrounds and encloses the heater coil 20. The cylindrical proximal end 60 is press fit inserted into the distal end of the distal heat transfer cylinder 54 of the outer sleeve 14. The distal end 64 of the tip 18 may have any number of desired shapes, including pointed, beveled, chisel, oval, round, triangle or square. The middle section 62 of the tip has a small hollow axial core surrounding the thermocouple temperature sensor 22. The middle section 62 and the thermocouple temperature sensor 22 are initially formed to have round cross-sections. After the thermocouple temperature sensor 22 is pressed into the hollow axial core of the middle section 62, they two elements are squeezed into a flattened oval shape, as shown by the cross-sectional view of FIG. 3. The tip 18 is formed from a metal such as copper (Cu) which has a high heat conductivity. The insulation layer 26 between the heater coil 20 and the inner wall of the cylindrical proximal end 60 of the tip 18 is an electrical insulator preferably having a high heat conductivity. Heat generated by the heater coil 20 is transferred to the cylindrical proximal end 60 of the tip 18. Heat is rapidly conducted from the cylindrical proximal end 60 of the tip 18 through the middle section 62 to the distal end 64 of the tip 18.

The middle section 62 has the same outer diameter as the heat transfer cylinder 54 of the outer sleeve 14. The outer diameter of the middle section 62 of the tip 18 is larger than the outer diameter of the proximal end 50 of the outer sleeve 14, and may preferably have a diameter greater than the diameter of the cylindrical proximal end 60 that is twice the thickness of the proximal end 50 of the hollow outer sleeve 14.

FIG. 3 is a cross-section through the middle section 62 of the tip 18 at line 3-3 of FIG. 1, illustrating the pressed middle section 62 and the thermocouple temperature sensor 22. Before press processing, the middle section 62 is circular. As the result of press processing, the middle section 62 is formed to have flat surfaces A and B. The thermocouple temperature sensor 22 is similarly deformed to have flat surface C and D inwardly positioned and corresponding to the flat surfaces A and B of the middle section 62. As a result of the press processing, there are strong static friction forces at the boundary between the thermocouple temperature sensor 22 and the interior of middle section 62 along the flat surfaces C and D. FIG. 3 illustrates the deformation caused by press processing on opposite sides of the middle section 62. It may be appreciated that the press processing can be provided at two, four, six or eight points around the middle section 62, with the end shape reflecting the number of press points.

To construct the assembly illustrated in FIG. 1, the components illustrated in FIG. 2 are assembled and then installed in the tip 18 and outer sleeve 14. The distal end wire 40 is argon welded to the return wire 44 to form the thermocouple temperature sensor 22. The return wire 44 is then inserted axially through the insulation cylinder 24 and the heater coil 20 is wrapped around the insulation cylinder 24. The connecting wire 32 is attached to the proximal end wire 30. The second connecting wire 34 may be attached to the connecting wire 32 before or after the connecting wire 32 is attached to the proximal end wire 30. A liquid dielectric adhesive is applied to the heater coil 20 to form the insulation layer 26. After the adhesive is applied to the entire heater coil 20, the distal end thermocouple temperature sensor 22 of the assembly is inserted into the axial bore in the center of the middle section 62 of the tip 18 and the heater coil 20 is positioned within the cylindrical proximal end 60 of the tip 18. The adhesive forming the insulation layer 26 solidifies within the cylindrical proximal end 60. After the adhesive attaches to the inner surface of the cylindrical proximal end 60, the middle section 62 is pressed. The compression force applied to the middle section 62 deforms the middle section 62 as well as the thermocouple temperature sensor 22. As a result of the press process, the thermocouple temperature sensor 22 is pressed to the inner surface of the middle section 62.

After the thermocouple temperature sensor 22 is pressed to the middle section 62, the cylindrical proximal end 60 is then inserted into the outer sleeve 14. The return wire 44 and the second connecting wire 34 are then attached to the respective electrical contacts 56 and 58 at the proximal end the cartridge 10. When the cartridge 10 is inserted into the handle 12, a control circuit in the handle is electrically connected to the electrical contacts 56 and 58.

The middle section 62 transfers heat from the heater coil 20 to the distal end 64 of tip 18. The middle section 62 is formed to transfer heat effectively. Even after the press processing, the middle section 62 is thicker than the cylindrical proximal end 60 of the tip 18, and the inner diameter bore of the middle section 62 is smaller than the inner diameter of the cylindrical proximal end 60. Therefore, heat from the heater coil 20 is efficiently transferred from the proximal end 60 to the distal end 64 of the tip 18 so that the temperature at the proximal end 60, the middle section 62 and the distal end 64 of the tip 18 are about equal. The inner surface of the middle section 62 is pressed to the thermocouple temperature sensor 22 directly so that the temperature sensor 22 accurately reflects the temperature of the middle section 62 and thus the distal end 64. The electrical potential measured between the return wire 44 and the second connecting wire 34 immediately and accurately reflects the temperature change at the thermocouple temperature sensor 22. The control circuit for the heating device can use the electrical potential measurement to judge any temperature gap between a target temperature for the cartridge 10 and the actual temperature of the tip 18. The control circuit can then adjust the power supplied to the cartridge 10 with high accuracy.

The invention has been described in detail above in connection with the figures, however it should be understood that the description is exemplary and that other variations of the concept are herein contemplated. The concept of the present invention as described above can be applied not just to soldering cartridges as described and illustrated, the invention may be may applicable to other types of heating tools such as thermal tweezers and desoldering tools. The cartridge 10 and the handle 12 described herein may be unified. The bimetallic thermocouple temperature sensor 22 may be another type of temperature sensor. The thermocouple temperature sensor 22 and the heater coil 20 may be formed separately. While the shape of the distal end 64 of the tip 18 in FIG. 1 is depicted as a cone shape, the distal end 64 may be formed as any number of alternative shapes to accommodate the soldering tasks and items to be soldered. In addition, the description above and the appended figures describe and depict a soldering cartridge. However, the invention is not limited to a soldering cartridge, the cartridge may be another type of heating tool for example a thermal tweezer including two tweezer cartridges combined in a tweezer tool, and the tip is a tweezer tip. Alternatively, the heater coil 20 may not be a coil, it may be another type of heater element for example a ceramic heater integrally formed on the insulation cylinder 24. The proximal end wire 30 may be covered by the insulation layer 26. If there is no risk that the first connecting wire 32 overheats, the second connecting wire 34 may be omitted.

Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:
1. A heating tool comprising:
   a cartridge including heater assembly, sleeve and tip, said tip having a hollow cylindrical proximal end, a middle section having an axial bore, and a distal end;
   said heater assembly including a heater coil having a distal end wire extending to a thermocouple temperature sensor;
   said heater coil secured in said hollow cylindrical proximal end of said tip with a dielectric insulating adhesive: and
   said thermocouple temperature sensor formed from welding said distal end wire of said heater coil to a return wire formed of a dissimilar metal, said thermocouple temperature sensor sized to fit the inside diameter of said axial bore of said middle section and then said thermocouple temperature sensor is secured within and press-processed radially deformed together with said middle section of said tip whereby the peripheral surface of said thermocouple temperature sensor is deformed into intimate contact with the deformed axial bore of said middle section of said tip.

2. The heating tool of claim 1, further comprising:
a return wire extending from said thermocouple through said heater coil to a proximal end of said cartridge; said return wire formed from a nickel or nickel alloy material and said heater coil and end wire formed from an iron-chromium alloy, said return wire welded to said end wire to form said thermocouple.

3. The heating tool of claim 2 wherein said heater coil and end wire are formed from a wire having a diameter between 0.2 mm and 0.45 mm and said return wire has a diameter of between 0.5 mm and 0.7 mm.

4. The heating tool of claim 1 wherein said axial bore of said middle section of said tip has a diameter smaller than the interior diameter of said hollow cylindrical proximal end of said tip and about the same diameter as a diameter of said thermocouple, and said axial bore of said middle section and an outer diameter of said middle section are aligned axially parallel.

5. The heating tool of claim 3 wherein said middle section of said tip is thicker than said cylindrical proximal end of said tip.

6. A heating tool comprising:
a cartridge including heater assembly, sleeve and tip, said tip having a hollow cylindrical proximal end, a middle section having an axial bore, and a distal end;
said heater assembly including a heater coil having a proximal end wire and an end wire extending distally from said heater coil to a thermocouple sensor sized to fit the inside diameter of said axial bore of said middle section, said heater coil secured in said hollow cylindrical proximal end of said tip with a dielectric insulating adhesive and said thermocouple sensor fitted into and then secured within and deformed together with said middle section of said tip whereby said thermocouple sensor is deformed together with said axial bore whereby the peripheral surface of said thermocouple sensor is in intimate contact with said axial bore of said middle part of said tip;
a return wire extending from said thermocouple sensor through said heater coil to a proximal end of said cartridge; said return wire formed from a nickel or nickel alloy material and said heater coil and end wire formed from an iron-chromium alloy, said return wire welded to said end wire to form said thermocouple sensor;
a connecting wire attached to said proximal end wire of said heater coil, said connecting wire having a diameter between 0.8 mm and 1.2 mm and said proximal end wire of said heater coil having a diameter between 0.2 mm and 0.45 mm.

7. The heating tool of claim 5 wherein said middle section of said tip has a thickness after the press process that is thicker than said hollow cylindrical proximal end of said tip.

8. The heating tool of claim 1, wherein said middle section is press processed deformed at multiple points.

* * * * *